US006896521B2

(12) United States Patent
Underhill et al.

(10) Patent No.: US 6,896,521 B2
(45) Date of Patent: May 24, 2005

(54) METHOD FOR DISPLAYING TOILET TRAINING MATERIALS AND DISPLAY KIOSK USING SAME

(75) Inventors: Richard Louis Underhill, Neenah, WI (US); David Jon Wears, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/192,133

(22) Filed: Jul. 9, 2002

(65) Prior Publication Data

US 2002/0177111 A1 Nov. 28, 2002

Related U.S. Application Data

(63) Continuation of application No. 09/672,248, filed on Sep. 28, 2000, now Pat. No. 6,612,846.

(51) Int. Cl.$^7$ .............................................. G09B 25/00
(52) U.S. Cl. ....................................... 434/365; 434/395
(58) Field of Search ................................ 434/365, 367, 434/369, 258, 259, 260, 377, 382, 392, 247; 206/581; 40/1, 124.2, 124.4, 124, 605, 606

(56) References Cited

U.S. PATENT DOCUMENTS

| 4,044,405 A | * | 8/1977 | Kreiss | 434/247 |
| 4,160,271 A | * | 7/1979 | Grayson et al. | 700/90 |
| 4,608,773 A | | 9/1986 | White | |

(Continued)

FOREIGN PATENT DOCUMENTS

WO   W95/05892   3/1995

OTHER PUBLICATIONS

Hauck, Mary Rundahl, Ph.D., "Factors Influencing Toileting Behaviors in Toddlers", The University of Wisconsin—Milwaukee, 1988, UMI Dissertation Services, Order No. 8916003.

Schmitt, Barton D., M.D., "Toilet Training Without Tears," Internet web p., http://www.vh.org/Patients/IHB/Peds/Phych/Toilet_Train.html, Virtual Hospital, University of Iowa, viewed and printed Sep. 25, 2000, pp. 1–4.

"Diapering & Toilet Training," Internet web p., http://store.babycenter.com/html/ey_fnb_toilet.shtml, viewed and printed Sep. 25, 2000, 1 page.

"Potty Accessories," Internet web p., http://store.babycenter.com/baby/g/category/00/26/63/1.shtml, viewed and printed Sep. 25, 2000, 1 page.

"Potty Seats," Items 1–10 of 17, Internet web p., http://store.babycenter.com/baby/g/category/00/20/39/1.shtml, viewed and printed Sep. 25, 2000, pp. 1–2.

"Potty Seats," Items 11–17 of 17, Internet web p., http://store.babycenter.com/baby/g/category/00/20/39/2.shtml, viewed and printed Sep. 25, 2000, pp. 1–2.

"Potty Training Videos," Internet web p., http://store.babycenter.com/baby/g/category/00/23/76/1.shtml, viewed and printed Sep. 25, 2000, 1 page.

(Continued)

Primary Examiner—Kurt Fernstrom
(74) Attorney, Agent, or Firm—H. Michael Kubicki; Thomas M. Gage (57) ABSTRACT

A method for displaying toilet training materials which includes the steps of providing a supply of at least two different types of toilet training materials, each type of toilet training material associated with at least one of a plurality of toilet training steps; providing a display having at least two regions, each of the regions associated with one of the toilet training steps; and housing the toilet training materials within the region having an equivalent toilet training step. Various embodiments of the display in the form of an in-store kiosk are illustrated.

2 Claims, 6 Drawing Sheets

U.S. PATENT DOCUMENTS

| | | | | |
|---|---|---|---|---|
| 4,744,113 A | * | 5/1988 | Kogut | 4/661 |
| 4,940,464 A | * | 7/1990 | Van Gompel et al. | 604/396 |
| 5,037,302 A | | 8/1991 | Sirota | |
| 5,117,515 A | * | 6/1992 | White et al. | 4/661 |
| 5,285,540 A | * | 2/1994 | Putz | 4/661 |
| 5,509,808 A | * | 4/1996 | Bell | 434/247 |
| 5,560,051 A | | 10/1996 | Butts | |
| 5,649,336 A | | 7/1997 | Finch et al. | |
| 5,649,914 A | | 7/1997 | Glaug et al. | |
| 5,658,268 A | | 8/1997 | Johns et al. | |
| 5,681,298 A | | 10/1997 | Brunner et al. | |
| 5,702,377 A | | 12/1997 | Collier, IV et al. | |
| 5,725,382 A | * | 3/1998 | Walter et al. | 434/258 |
| 5,838,240 A | | 11/1998 | Johnson | |
| 5,865,322 A | * | 2/1999 | Miller | 211/49.1 |
| 5,882,209 A | * | 3/1999 | Gabig et al. | 434/367 |
| 6,149,637 A | | 11/2000 | Allen et al. | |
| 6,250,929 B1 | | 6/2001 | Kolb et al. | |

OTHER PUBLICATIONS

"Toilet Training Books," Internet web p., http://store.babycenter.com/baby/g/category/04/32/90/1.shtml, viewed and printed Sep. 25, 2000, pp. 1–2.

"Toilet Training: Your Questions, Answered," Internet web p., http://www.babycenter.com/refcap/4415.html, viewed and printed Sep. 25, 2000, pp. 1–3.

"Training Pants," Internet web p., http://store.babycenter.com/baby/g/category/00/20/83/1.shtml, viewed and printed Sep. 25, 2000, 1 page.

"The Pull–Ups 'Big Kid' Toilet Training Guide", Kimberly–Clark Corporation, 1995, 20 pages.

"Ready, Out, Coach! The 3–Step Parent–Coached Approach to Toilet Training," Kimberly–Clark Corporation, 1999, 8 pages.

* cited by examiner

METHOD FOR DISPLAYING TOILET TRAINING MATERIALS AND DISPLAY KIOSK USING SAME

This application is a continuation of application Ser. No. 09/672,248 entitled Method For Displaying Toilet Training Materials And Display Kiosk Using Same and filed in the U.S. Patent and Trademark Office on Sep. 28, 2000 now U.S. Pat. No. 6,612,846. The entirety of application Ser. No. 09/672,248 is hereby incorporated by reference.

BACKGROUND OF THE INVENTION

The present invention relates to a method for displaying toilet training materials, and more particularly to a method for displaying toilet training materials in which the toilet training materials are linked to specific steps in the toilet training process.

From birth to an age of about two years old, little boys and girls wear diapers until they are ready for the toilet training process, when they learn to use the toilet by themselves. Some children may start the toilet training process as early as the age of twelve months, while others may not be ready until after the age of two years. The age at which a child will begin this training process is dependent upon many factors, some of which are psychological, some physiological, and some unique to the individual child or his or her environment.

The toilet training process may embrace a number of aspects. One aspect is the ability of the caregiver to determine the readiness of the child to begin toilet training. Many caregivers, such as parents, have difficulty in determining the readiness of a child to begin the toilet training process. Another aspect of the toilet training process is the change from diapers to training pants to help the child understand that he or she should now use the toilet just like grownups. Still another aspect of the toilet training process includes caregiver instruction, including positive encouragement and reinforcement to the child that he or she should now be using a toilet, instead of diapers.

Although an attentiveness to signals of readiness in the child as well as the use of training pants and positive encouragement from the caregiver have been helpful in the toilet training process, there is still much room for improvement. Specifically, parents and caregivers are still searching for an easier and quicker way for guiding their children successfully through the toilet training process.

Various toilet training products currently exist, including disposable training pants, disposable bed pads, books, videotapes, "potty" chairs, toilet targets for boys, progress charts with stickers, and the like. However, none of these products individually have completely solved the need for a method or technique for making the toilet training process easier and quicker, for both every caregiver and every child. Moreover, these various toilet training products are not sold together; they are often sold at different stores, or at different locations within the same store. Consumers are currently unable to view and evaluate various categories of toilet training materials at an integrated location, and often lack guidance in selecting toilet training products most suitable for the particular circumstances of a particular child.

In light of the problems discussed above, there still exists a need for improved methods of understanding and addressing the various aspects of the toilet training process, for providing ready access to the wide range of toilet training materials available, and for helping consumers understand the roles of different toilet training materials in an effective approach to toilet training.

SUMMARY OF THE INVENTION

In response to the discussed difficulties and unmet needs encountered in the prior art, a method for displaying toilet training materials has been developed.

In one aspect, the present invention relates to a method of displaying toilet training materials which includes the steps of providing a supply of at least two different types of toilet training materials, each type of toilet training material associated with at least one of a plurality of toilet training steps; providing a display having at least two regions, each of the regions associated with one of the toilet training steps; and housing the toilet training materials within the region associated with the corresponding toilet training step.

In still another aspect, the present invention relates to a display for vending toilet training materials which includes a supply of at least two different types of toilet training materials, each type of toilet training material associated with at least one of a plurality of toilet training steps; and a display structure having at least two regions, each of the regions associated with one of the toilet training steps, the toilet training materials being housed within the region associated with the corresponding toilet training step.

In particular embodiments, the plurality of toilet training steps can comprise a readiness step, a transitional step, and a coaching step. Also in particular embodiments, the method can further include: collecting information from a consumer regarding her child's behavioral characteristics having relevance to toilet training; selecting toilet training materials appropriate to the child's level of development; and providing at least one recommendation that directs the consumer to purchase the selected toilet training materials. The information can be collected via an interactive mechanism, including but not limited to those employing a computer. The display structures can comprise, in particular embodiments, an in-store kiosk or set of kiosks, a section of shelf space, a shelf insert, or the like. In one particular embodiment, the display comprises a free-standing kiosk with one or more open sides.

BRIEF DESCRIPTION OF THE DRAWINGS

The above-mentioned and other features of the present invention and manner of attaining them will become more apparent, and the invention itself will be better understood, by reference to the following description of the invention, taken in conjunction with the accompanying drawings.

DETAILED DESCRIPTION OF THE DRAWINGS

The present invention relates to a method for displaying toilet training materials, and more particularly to a method for displaying toilet training materials in which the toilet training materials are linked to specific steps in the toilet training process.

One of the most important desires of caregivers in the toilet training process is that the process should be easier and quicker, both for the caregiver as well as the child. The toilet training process is not a simple procedure resulting in immediate success, but rather is often a time-consuming effort, often beset with frustration and problems. With the multitude of toilet training products available, it might be expected that the toilet training process would be a simpler endeavor. However, the toilet training process continues to be a complicated exercise and challenging experience for both child and caregiver. Among the problems involved in the toilet training process are the many different approaches to toilet training; inconsistent application of any one toilet training approach; the complex selection of products from which to choose, the inability to quickly locate the correct toilet training product; and the like. Because of these problems, various approaches to making the toilet training process easier and quicker were investigated.

The result of these efforts is the invention of a new method of displaying toilet training materials, for example, within a retail store. The method, in its various forms, can achieve a number of objectives. First, the method of the present invention can provide to consumers a single, integrated location in a retail store at which to view and evaluate various toilet training materials. Second, the method of the present invention can effectively present information to consumers pertaining to effective toilet training procedures, including specific steps discovered to be highly effective at helping caregivers toilet train their children. Third, the preferred method of the present invention can provide toilet training guidance to consumers by linking specific toilet training materials to specific steps in the toilet training process, thereby improving consumers' understanding of the proper and most effective roles of particular toilet training materials.

Referring to FIGS. 1–6, the method of the present invention includes among its elements toilet training materials 20. The term "toilet training materials" as used herein refers to any items that can be used to facilitate toilet training, and can be roughly categorized by type. Categories of types of toilet training materials include, but are not limited to, disposable absorbent articles 22, educational materials 24, promotional materials 26, progress rewards 28, and encouragement devices 30. The term "disposable absorbent articles" as used herein refers to any disposable absorbent articles suitable for use during the toilet training process, including but not limited to disposable training pants, disposable swimwear, disposable diapers or diaper pants, disposable youth pants, disposable wipes, and disposable bed pads. The term "disposable" is used herein to describe absorbent articles which are not intended to be laundered or otherwise reused as an absorbent article, but rather are intended to be discarded after a single use. The term "educational materials" as used herein refers to any materials that can be used to teach a caregiver or a child skills related to toilet training, such as, for example, toilet training books, videotapes, readiness tip sheets, brochures, or the like. The term "promotional materials" as used herein refers to apparel, accessories, posters, toys, or the like bearing a logo, trademark, or other sign identifying a brand of toilet training material such as, for example, Huggies® Pull-Ups®, a trademark of Kimberly-Clark Corporation, headquartered in Dallas, Tex., U.S.A. The term "progress rewards" as used herein refers to items suitable as rewards to a child for progress made during the toilet training process, including, for example, candy, fruit, drinks, toys, "potty training" diplomas, stickers, training flashcards, games, crayons, or the like. The term "encouragement devices" as used herein refers to materials which encourage a child to succeed during the toilet training process, including, for example, wetness awareness devices such as musical alarms, wetness inserts for disposable training pants or underwear, toilet training progress charts, urine toilet targets, interactive toilet training kits, or the like.

Referring again to FIGS. 1–6, the method of the present invention also includes a display 40. The term "display" as used herein refers to any setting or presentation of toilet training materials in open view, including, for example, an in-store kiosk or set of kiosks 50, a section of shelf space, a shelf insert, or the like. In one desirable embodiment, the display 40 can comprise an in-store kiosk. The term "kiosk" as used herein refers to a free-standing structure with one or more open sides used to vend merchandise, display promotional insignia, communicate information to a consumer, house an interactive mechanism, or the like. The kiosk 50 can be in any form suitable for vending toilet training materials. Preferably, the kiosk contains one or more partitions 46 to segregate different types of toilet training materials. The kiosk may include one or more signs 48. FIGS. 1–6 representatively illustrate presently desirable kiosk designs.

In the method of the present invention, the toilet training materials 20 are housed within the display 40. The display 40 preferably houses at least two different types of toilet training materials 20. For example, in one desirable embodiment, the display 40 houses disposable absorbent articles 22 such as disposable training pants and educational materials 24 such as books and/or videos. In another desirable embodiment, the display 40 houses disposable absorbent articles 22, educational materials 24, promotional materials 26 such as apparel, progress rewards 28 such as toys and/or candy, and encouragement devices 30 such as progress charts and/or interactive toilet training kits.

Figure 1:
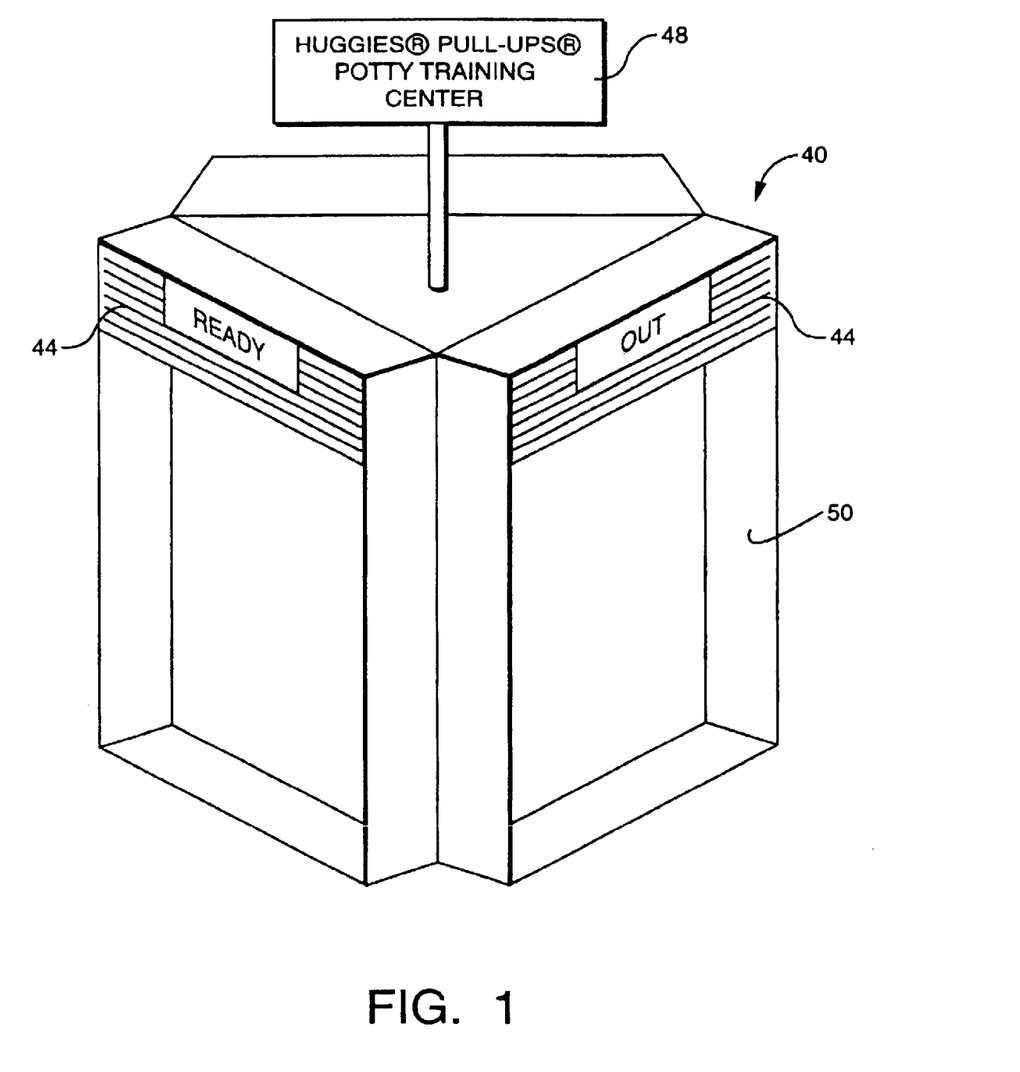
FIG. 1 representatively illustrates a perspective view of one embodiment of the method of the present invention.
Figure 2:
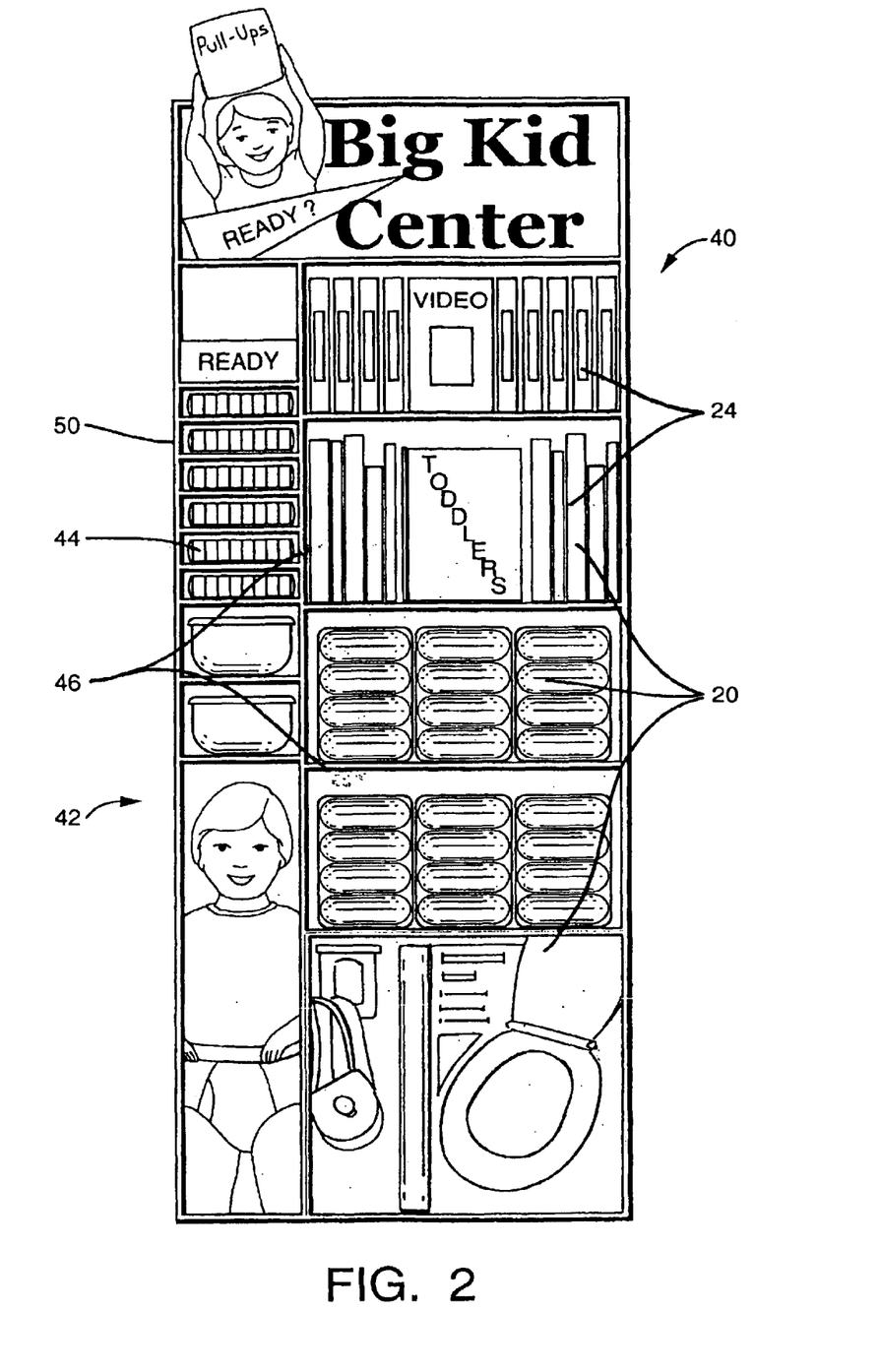
FIG. 2 representatively illustrates a planar view of one side of the embodiment of FIG. 1, having toilet training materials disposed therein.
Figure 3:
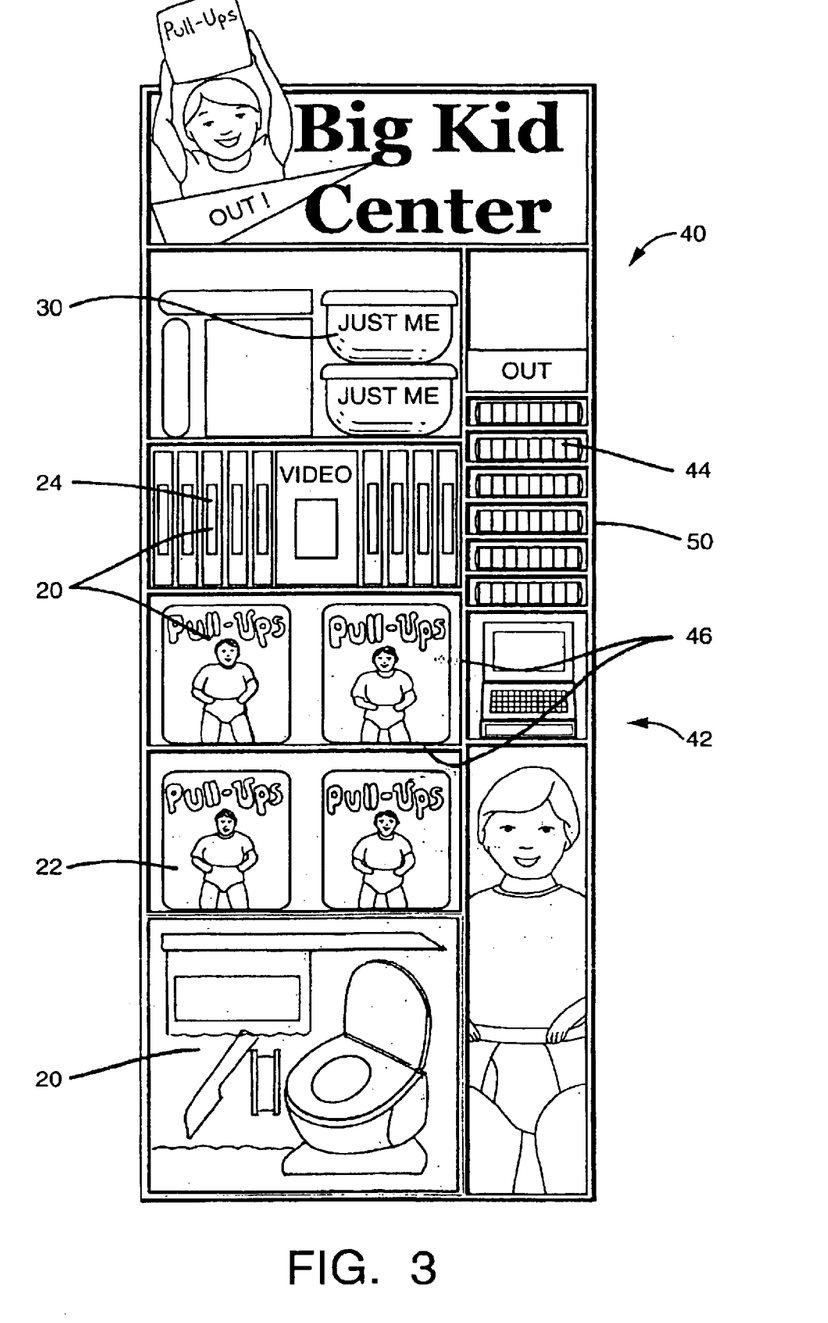
FIG. 3 representatively illustrates a planar view of another side of the embodiment of FIG. 1, also having toilet training materials disposed therein.
Figure 4:
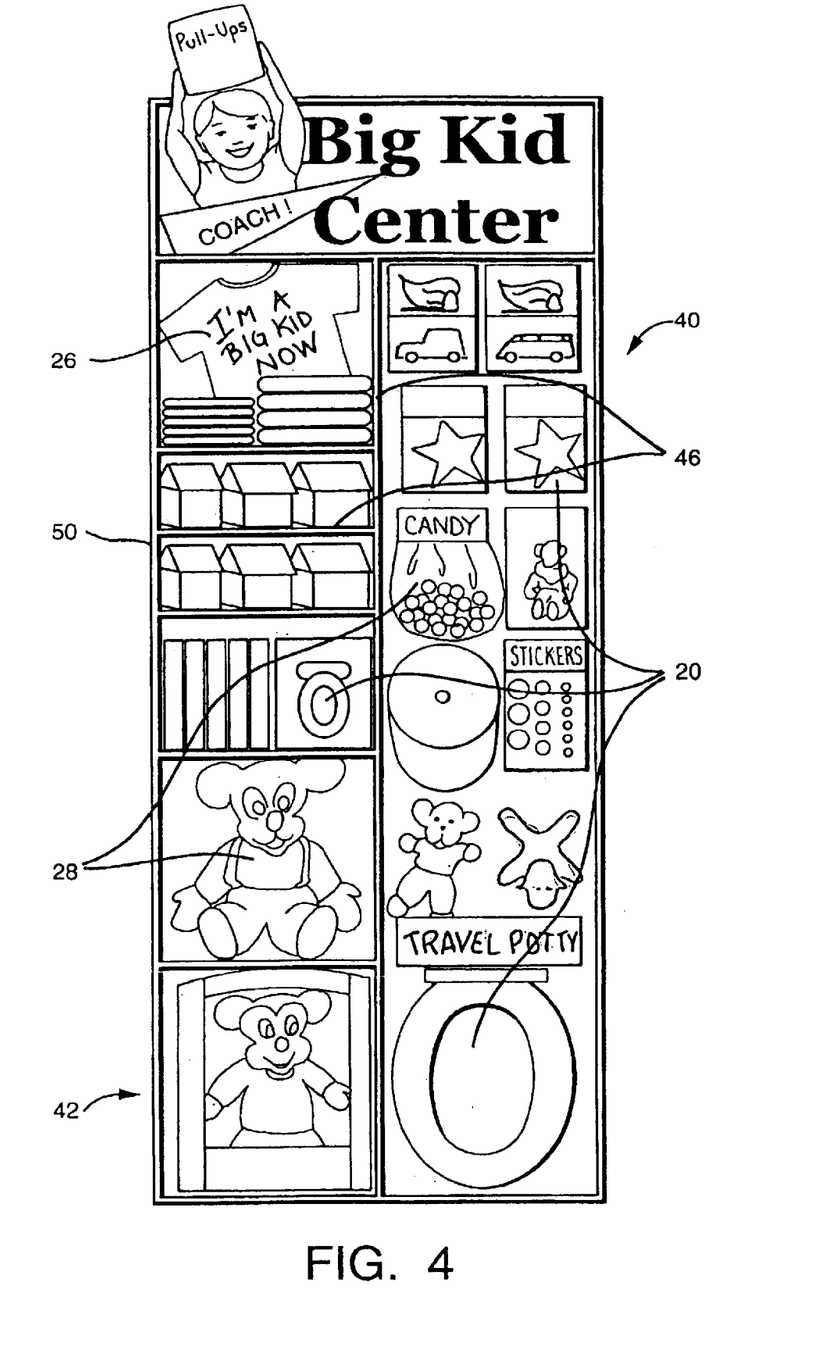
FIG. 4 representatively illustrates a planar view of yet another side of the embodiment of FIG. 1, also having toilet training materials disposed therein.
Figure 5:
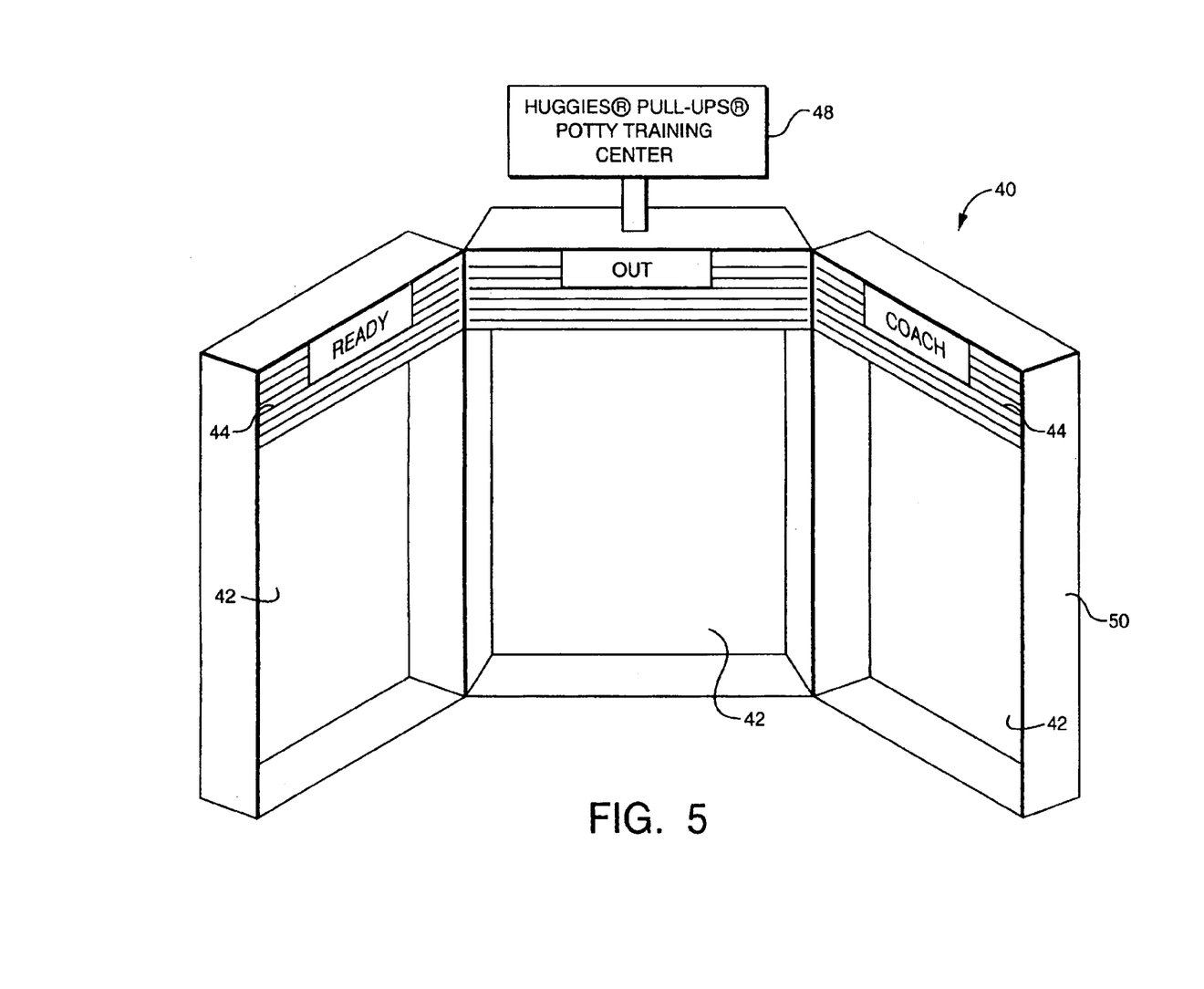
FIG. 5 representatively illustrates a perspective view of another embodiment of the method of the present invention.
Figure 6:
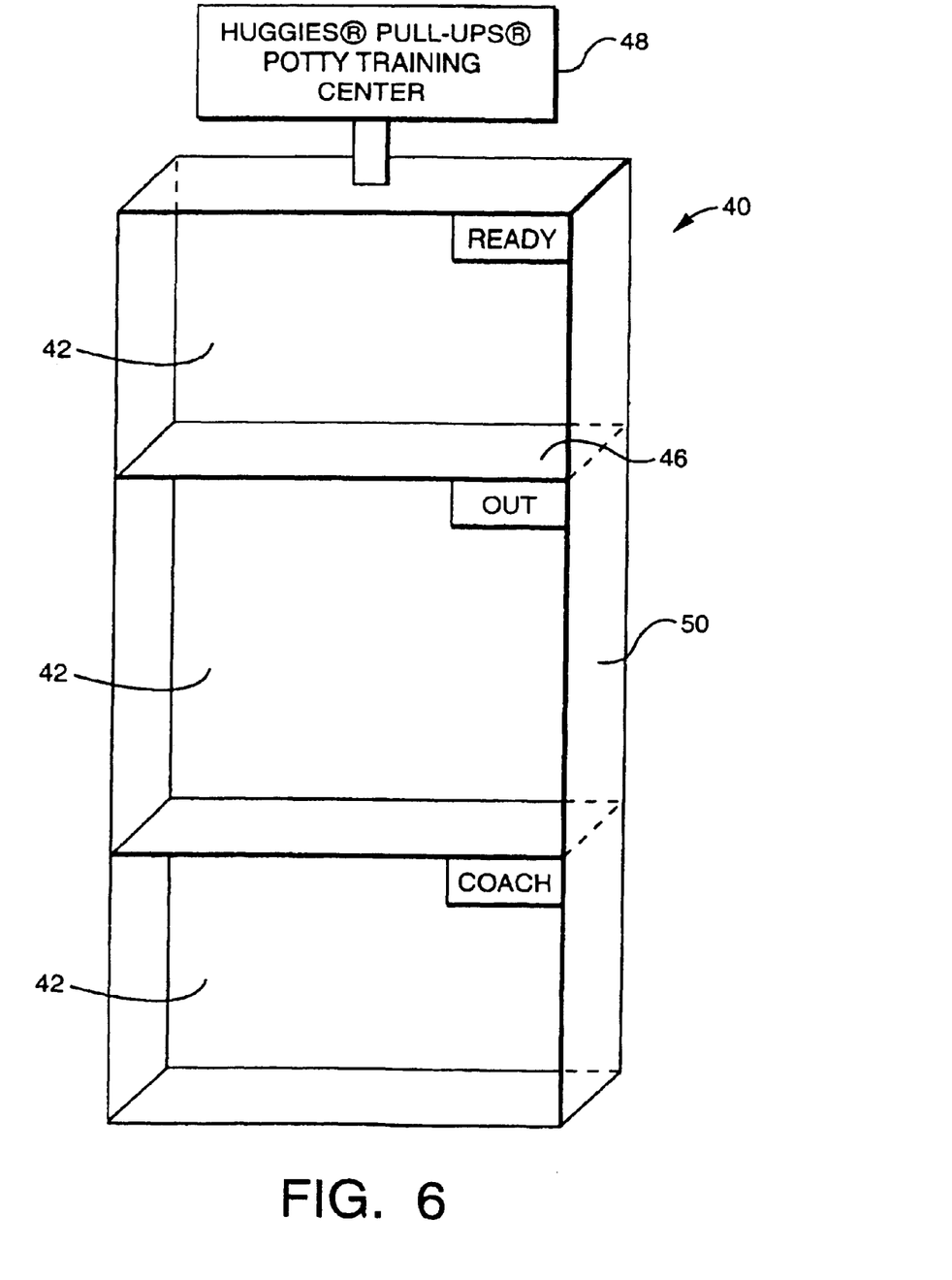
FIG. 6 representatively illustrates a perspective view of another embodiment of the method of the present invention.

The method of the present invention can also convey toilet training information 44 to a consumer. The information 44 may provide guidance to the consumer regarding the toilet training process, outline particular steps or stages in the toilet training process, advise caregivers on how to guide and motivate their child during toilet training, describe, recommend, or promote particular toilet training products, or the like. The information 44 can be in the form of text messages disposed on the display 40 as illustrated in FIGS. 1 and 5, or in another form such as hand-outs, scrolling text, audio messages, or the like. Further, the method of the present invention can include such steps as, but not limited to, collecting information from a consumer, selecting toilet training materials appropriate to the consumer's needs, and providing one or more recommendations that direct the consumer to purchase the selected toilet training materials. For example, in one embodiment, the method of the present invention includes the steps of collecting information from a consumer regarding her child's behavioral characteristics having relevance to toilet training; selecting toilet training materials appropriate to the child's level of development; and providing one or more recommendations that direct the consumer to purchase the selected toilet training materials.

Such steps as collecting information from consumers, selecting appropriate toilet training materials, providing purchasing recommendations, or the like can be performed via any suitable mechanism located in or upon the display 40, including but not limited to text or charts, an interactive dial that a consumer can manipulate to identify the needs of her and her child, or an interactive computer which would receive input from the consumer regarding her child, process the information, and provide the consumer with recommendations. One particular mode of identifying a child's stage of toilet training and selecting appropriate toilet training materials is disclosed in U.S. patent application Ser. No. 09/349,531 filed Jul. 8, 1999 by T. M. Kolb et al. and assigned to Kimberly-Clark Worldwide, Inc.

The display 40 of the method of the present invention can also include one or more regions 42, each of which is associated with a toilet training step. In such a design, each region 42 of the display 40 can house a supply of one or more types of toilet training materials 20. Further, each type of toilet training material 20 is associated with one or more of the toilet training steps, and each region 42 of the display 40 houses those types of toilet training materials 20 associated with the corresponding toilet training step. The regions 42 may be delineated by any appropriate means, including, for example, partitions 46 within the display 40. The term "partition" as used herein refers to a shelf, wall, graphic separator, or other physical or visual dividing element within a display that segregates different types of products.

In one particular embodiment, discovered to contribute significantly to the success of the toilet training process, the display 40 can include three regions 42, each of which is associated with one of three toilet training steps, wherein the toilet training steps constitute a readiness step, a transitional step, and a coaching step. The term "readiness step" as used herein refers to an effort by a caregiver to observe behavioral characteristics of her child that indicate a readiness to begin toilet training. Behavioral characteristics in a child that indicate a readiness to begin toilet training include such signs as staying dry for two hours or during a nap, regular and predictable bowel movements, wanting wet or soiled diapers changed, understanding and following simple directions, showing interest in the bathroom, indicating the need to "go potty" by words, posture, or facial expression, wanting to wear training pants or underwear, or the like. The term "transitional step" as used herein refers to actions taken by a caregiver to move her child out of diapers into disposable training pants, cloth training pants, or underwear. The term "coaching step" as used herein refers to actions taken by a caregiver to encourage and guide her child during the toilet training process. Effective coaching includes such techniques as praising the child for progress made throughout the toilet training process; constant and positive reminders throughout the toilet training process; consistency in language and approach; the use of rewards for progress made during toilet training including different levels of rewards for different levels of success; or the like.

Hence, in one particularly desirable embodiment, the display 40 of the method of the present invention can include three regions 42, one of which is associated with a readiness step, one of which is associated with a transitional step, and one of which is associated with a coaching step. The display preferably includes insignia to indicate each region's association with a particular toilet training step. For example, in a desirable embodiment, the readiness-step region, the transitional-step region, and the coaching-step region could be identified by insignia such as "READY," "OUT," and "COACH," respectively.

Each region 42 can contain any number of types of toilet training materials 20. Preferably, each region contains those types of toilet training materials having relevance to the toilet training step associated with the region, and more preferably each region contains only those types of toilet training materials having relevance to that region. In this way, the method of the present invention quickly directs the consumer's attention to those products most suitable to the consumer's toilet training needs. For example, in an embodiment consisting of three regions, each of which is associated with one of three toilet training steps, wherein the toilet training steps constitute a readiness step, a transitional step, and a coaching step. The types of toilet training materials 20 housed within the readiness-step region preferably include items such as toilet training books, toilet training videos, readiness "tip" sheets, "potty" chairs, toilet inserts, portable "potty" inserts, toilet training starter kits, parental guides to toilet training, dolls that show how to use the toilet, toilet training coloring books, other toilet training educational materials as defined herein, and other materials used to generate child interest in toilet training. The types of toilet training materials housed within the transitional-step region preferably include items such as promotional apparel and accessories, disposable training pants, disposable underpants, disposable clothing such as swimwear, disposable wipes for children, disposable absorbent bed pads, special toilet paper with children's graphics, "bathroom in-use" door hangers, or the like. The types of toilet training materials housed within the coaching-step region preferably include such items as progress rewards and encouragement devices, both defined herein.

As previously described, the method of the present invention can convey toilet training information 44 to a consumer. In particular, the information 44 may provide guidance to the consumer regarding particular toilet training steps, and describe, recommend, or promote particular toilet training products having relevance to those steps. For example, in one embodiment, a display 40 having a readiness-step region, a transitional-step region, and a coaching-step region can include text or insignia within each region 42 intended to convey toilet training information specific to the toilet training step associated with that region. In this way, the method of the present invention educates the consumer in the use of the three toilet training steps found to be highly effective and described herein; provides the consumer with a variety of toilet training products appropriate for use with the three toilet training steps herein described in one integrated location within a retail store; and presents information to the consumer linking each type of toilet training material with one of the toilet training steps, thereby aiding purchase decisions.

While particular embodiments of the method of the present invention have been illustrated and described, it will be understood that it is capable of further modifications. It is therefore intended to cover any variations, equivalents, uses, or adaptations of the invention following the general principles thereof, and including such departures from the present disclosure as come or may come within known or customary practice in the art to which this invention pertains and falls within the limits of the appended claims.

We claim:

1. A display for vending toilet training materials comprising:
   a supply of at least two different types of toilet training materials, each type of toilet training material associated with at least one of a plurality of toilet training steps;
   a display structure having at least two regions, each of the regions associated with one of the toilet training steps, the toilet training materials being housed within the region associated with the corresponding toilet training step; and insignia within each of the at least two regions identifying the corresponding toilet training step.

2. The display of claim 1 comprising at least three regions, three of the regions associated with one of three toilet training steps, and wherein the insignia identifies a first region as associated with a readiness step, a second region as associated with a transitional step, and a third region as associated with a coaching step.

* * * * *